United States Patent [19]

Coleman et al.

[11] Patent Number: 4,594,402

[45] Date of Patent: Jun. 10, 1986

[54] LONG CHAIN HYDROCARBON AND FLUOROCARBON REACTIVE INTERNAL RELEASE AGENTS FOR CONDENSATION POLYMERS

[75] Inventors: Charles R. Coleman, Pittsburgh; Thomas G. Rukavina, Lower Burrell, both of Pa.

[73] Assignee: PPG Industries, Inc., Pittsburgh, Pa.

[21] Appl. No.: 755,971

[22] Filed: Jul. 17, 1985

Related U.S. Application Data

[63] Continuation of Ser. No. 376,857, May 10, 1982, abandoned.

[51] Int. Cl.$^4$ .............................................. C08G 18/30
[52] U.S. Cl. ........................................ 528/49; 528/70; 528/76; 528/83; 528/85
[58] Field of Search ................. 528/49, 70, 76, 83, 528/85

[56] References Cited

U.S. PATENT DOCUMENTS

| | | | |
|---|---|---|---|
| 3,808,077 | 4/1974 | Rieser et al. | 156/102 |
| 3,838,105 | 9/1974 | Brackman | 528/83 |
| 3,900,686 | 8/1975 | Ammons et al. | 428/425 |
| 4,098,772 | 7/1978 | Bonk et al. | 528/49 |
| 4,277,299 | 7/1981 | Cherenko et al. | 156/242 |

Primary Examiner—Maurice J. Welsh
Attorney, Agent, or Firm—Donna L. Seidel

[57] ABSTRACT

A method for obtaining improved release of a polymer from a contacting surface by incorporating a reactive internal release agent in the polymer reaction mixture is disclosed.

8 Claims, No Drawings

LONG CHAIN HYDROCARBON AND FLUOROCARBON REACTIVE INTERNAL RELEASE AGENTS FOR CONDENSATION POLYMERS

This application is a continuation of U.S. application Ser. No. 376,857 filed May 10, 1982 by the same inventors, which is now abandoned.

BACKGROUND OF THE INVENTION

1. Field of the Invention

The present invention relates generally to the art of polymerization, and more particularly to the art of making polymer compositions which release from surfaces contacted during processing.

2. Discussion of the Technology

Release of polymer materials from molds or other processing surfaces is generally accomplished by applying a release agent at the interface of the polymer and the processing surface.

For example, U.S. Pat. No. 3,808,077 to Rieser et al discloses fabricating bilayer safety glass by assembling a preformed plastic sheet between a glass sheet and a mold coated with a release agent such as polyvinylidene fluoride, polyethylene glycol terepthalate, organopolysiloxanes, and high silica content glass resins.

U.S. Pat. No. 4,278,299 to Cherenko et al discloses a mold release composition comprising a phenyl methyl polysiloxane resin and a phenyl methyl siloxane fluid useful in laminating polyurethane to glass.

U.S. Pat. No. 3,900,686 to Ammons et al discloses that a combination of an organic phosphorus acid such as stearyl acid phosphate and an organic silane provides controlled adhesion between polyurethane and glass layers in a laminate.

Inert materials which affect the adhesion of a polymeric material to a contacting surface may be considered nonreactive internal release agents. However, these may be incompatible with the polymer composition at levels high enough to effect release. For example, the release agent may form a haze in an otherwise transparent polymer.

SUMMARY OF THE INVENTION

The present invention provides a polymer reaction mixture with a reactive internal release agent. Polyurethane compositions of the present invention achieve improved release from a casting cell or mold by means of a low adhesion surface provided by long chain hydrocarbon or fluorocarbon radicals pendent from the polymer backbone. Compounds useful in accordance with the present invention contain at least one functional group capable of reacting with the isocyanate or polyol urethane reactants. Since these compounds are reactive internal release agents, incompatibility with the reaction mixture is not a problem.

Release properties are provided by a straight or branched chain hydrocarbon or fluorocarbon compound, preferably having at least 6 carbon atoms beyond the reactive functional group, which carbon chain is pendent from the polymer backbone. Long chain hydrocarbons and fluorocarbons, typically containing at least about 8 carbon atoms and containing hydroxyl or amine groups capable of reacting with isocyanate groups, are suitable reactive internal release agents for polyurethane reaction mixtures. Alternatively, long chain hydrocarbon or fluorocarbon compounds containing isocyanate groups capable of reacting with hydroxyl groups in the polyol component of the urethane reaction mixture may be used. Long chain acids or anhydrides may be used as reactive internal release agents in polyester reaction mixtures, while long chain aldehydes may be used in polyacetal reaction mixtures. Long chain epoxy compounds may be used as reactive internal release agents in polyether reaction mixtures. Preferably, the reactive internal release agent has more than one functional group, provided a sufficiently long chain remains beyond the additional functional group.

DESCRIPTION OF THE PREFERRED EMBODIMENTS

Polyurethane compositions in accordance with the present invention may be broadly defined as consisting essentially of an organic polyisocyanate and an organic compound having at least two hydrogens capable of reacting with the isocyanate to form polyurethane linkages. Preferably, the composition further comprises a crosslinking agent, typically an organic compound having at least three hydrogens capable of reacting with the isocyanate. The reactive internal release agent is a long chain hydrocarbon or fluorocarbon having at least one reactive hydrogen.

The organic polyisocyanate component should preferably be an organic diisocyanate. Cyclic aliphatic diisocyanates are preferred since they are not adversely affected by ultraviolet light and have high impact energy absorption levels. In addition, polyurethanes prepared with cyclic aliphatic diisocyanates are not adversely affected by conventional processing temperatures. A preferred cyclic aliphatic diisocyanate is 4,4'-methylene-bis(cyclohexyl isocyanate). Other dinuclear cyclic aliphatic diisocyanates which are preferred are those formed through an alkylene group of from 1 to 3 carbon atoms and which can be substituted with nitro, chloro, alkyl, alkoxy and other groups which are not reactive with hydroxyl groups, provided the substituents are not positioned so as to render the isocyanate group unreactive. Another preferred dinuclear cycloaliphatic diisocyanate is 4,4'-isopropylidene-bis-(cyclohexyl isocyanate). An example of a preferred mononuclear cyclic aliphatic diisocyanate is 1,4-cyclohexyl diisocyanate. Hydrogenated aromatic diisocyanates such as hydrogenated toluene diisocyanate, as well as dinuclear diisocyanates in which one of the rings is saturated and the other unsaturated, can also be employed. Mixtures of cyclic aliphatic diisocyanates with straight chain aliphatic diisocyanates and/or aromatic diisocyanates can also be employed. Thioisocyanates corresponding to the above diisocyanates can be employed, as well as mixed compounds containing both an isocyanate and a thioisocyanate group.

Straight chain aliphatic diisocyanates such as 1,4-tetramethylene diisocyanate, 1,6-hexamethylene diisocyanate, 1,10-decamethylene diisocyanate, and hexamethylene adipamide diisocyanate can also be employed. Suitable aromatic diisocyanates, although not preferred, can be employed in some instances, and include mononuclear types such as 2,4-toluene diisocyanate, 2,6-toluene diisocyanate, metaphenylene diisocyanate; dinuclear aromatic diisocyanates such as 4,4'-diphenylene diisocyananate and 1,5-naphthalene diisocyanate; halogenated substituted aromatic diisocyanates such as 4-chloro-1-3-phenylene diisocyanate; alkyl substituted diisocyanates such as 3,3'-dimethyl 4,4'-diphenylene diisocyanate; xylene diisocyanates including 1,3-xylene diisocyanate and 1,4-xylene diisocyanate; durene isocyanates such as 2,3,5,6-tetramethyl-1,4-diisocyanate; aromatic-cycloaliphatic diisocyanates such as 1,5-tetrahydronaphthalene diisocyanate; polynuclear aromatic diisocyanates bridging through aliphatic groups such as diphenyl methane diisocyanate and diphenyl isopropylidene diisocyanate; alkoxy substituted aromatic diisocyanates such as dianisidine diisocyanates; mononuclear aralkyl diisocyanates such as xylene diisocyanates; aliphatic branched chain diisocyanates such as 2,2,4-trimethylhexamethylene diisocyanate; and ester-containing aliphatic diisocyanates such as 2,6-diisocyanato methyl caproate (Lysine diisocyanate). In addition, sterically hindered compounds wherein the isocyanate groups differ in reactivity such as 2,4-diethylmethylene-bis-(4-phenylene isocyanate); 3-isocyanato methyl-3,5,5'-trimethylcyclohexyl diisocyanate and 2,6-diethyl-1,4-phenylene diisocyanate may also be employed. In addition, diisocyanates bonded from sulfonyl groups such as 1,3-phenylene disulfonyl diisocyanate and 1,4-xylene disulfonyl diisocyanate may be used.

The polyisocyanate component as described above is reacted with at least one compound containing at least two groups which are reactive with the isocyanate group. The preferred compounds are those which have at least two, preferably only two, active hydrogens per molecule, such as polyols and polyamines, preferably diols. Preferred compounds include polyester diols, polycarbonate diols and polyether diols, as well as chain extenders such as monomeric aliphatic diols, e.g. 1,4-butanediol and cyclohexanedimethanol. The polyisocyanate component also reacts with the reactive internal release agent which is defined as a compound comprising at least one hydrogen capable of reacting with the isocyanate and further comprising long chain hydrocarbon or fluorocarbon segments to provide release characteristics. Preferred internal release agents include $C_{12}$ and $C_{18}$ alcohols, preferably diols having only one terminal hydroxyl group. Most preferred are 1,2-dodecanediol and 1-octadecanol, especially in combination.

Preferred polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably from 4 to 8, carbon atoms, examples of which are adipic, succinic, glutaric, palmitic, suberic, azelaic and sebacic radicals. Suitable aliphatic diols contain from 2 to 15 carbon atoms, examples of which are ethylene glycol, 1,3-propanediol, 1,4-butanediol, 1,6-hexanediol and cyclohexanedimethanol. The number average molecular weight of the polyester diol prepared from aliphatic diols and carboxylic acids is preferably between about 500 and about 5000, preferably about 500 to 2000.

Polyester diols can also be made from the polymerization of lactone monomers. Polyester polyols from caprolactone can be prepared by subjecting a lactone represented by the formula:

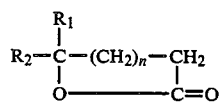

wherein $R_1$ and $R_2$ are each hydrogen or an alkyl of 1 to 10 carbon atoms, and n is an integer from 1 to 3, to polymerization in the presence of water or minor amounts of a low molecular weight glycol such as ethylene glycol, diethylene glycol, triethylene glycol, 1,4-butanediol, propylene glycol, 1,6-hexanediol, glycerine, etc. The ring opening in polymerization is generally effected at a temperature between about 50° C. and 300° C., and preferably in the presence of a catalyst. Preparation of polycaprolactones is well known in the polyester art. Suitable caprolactones include epsilon-caprolactones; monoalkyl, for example, methyl and ethylepsilon-caprolactones, dialkyl, for example dimethyl and diethylepsilon-caprolactones, cyclohexylepsilon-caprolactones, etc. The preferred lactone is epsilon-caprolactone. The number average molecular weight of polyesters prepared from polycaprolactone diols should be between about 300 to 5000, preferably about 300 to 2000.

The above described polyesters can be represented by the following formulae:

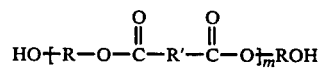

wherein R is the alkylene portion of the glycol used to prepare the polyester, R' is the alkylene portion of the dicarboxylic acid, and m is a number that ranges to about 15 or more; and

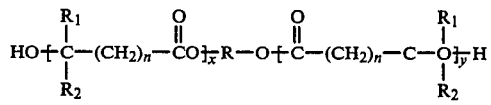

which represents polycaprolactones, wherein n is preferably 4, $R_1$ and $R_2$ are each hydrogen or $C_1$ to $C_{10}$ alkyl, preferably $C_1$-$C_4$ alkyl, R is the alkylene portion of the glycol used to ring open the lactone and x plus y is a number that ranges up to 30 or more, but x and y are not simultaneously 0.

Besides polyether and polyester diols, poly(alkylenecarbonate) diols such as poly(1,6-hexylenecarbonate) diol can be used. The preparation of the poly(alkylenecarbonate) diols can be carried out by reacting an aliphatic diol with phosgene; with a chloroformic acid ester; with a diaryl carbonate such as diphenyl carbonate, ditolyl carbonate, or dinaphthyl carbonate; or with a di-lower alkyl carbonate such as dimethyl, diethyl, or di-n-butyl carbonate, either by heating the reactants alone or with the use of an ester interchange catalyst depending on the identity of the reactants. Polycarbonates of different higher molecular weights are obtained depending on the proportions of reactants used. When carbonate ester reagents are used, a calculated quantity of the by-product monohydroxy compound is removed by distillation. Suitable alkylene diols include linear aliphatic diols having from about 4 to 10 carbon atoms such as 1,4-butanediol, 1,6-hexanediol and 1,10-decanediol, with 1,6-hexanediol being preferred. Poly(alkylenecarbonate) diols having number average molecular weights from 300 to 5000 are suitable, with a 300 to 2000 molecular weight range being preferred.

In synthesizing the polyurethanes, chain extension can be accomplished with a compound having two active hydrogens per molecule. The resulting polyurethanes have thermoplastic properties. Preferred chain extenders are aliphatic diols having a molecular weight below 250, and from 2 to 15 carbon atoms, such as ethylene glycol, 1,3-propanediol, 1,4-butanediol, 1,6-hexanediol and cyclohexanedimethanol.

The polyurethane can be cured with a compound having more than two active hydrogens per molecule. The resulting polyurethanes have thermosetting properties. Representative curing agents are polyols having at least three hydroxyl group, such as trimethylolpropane, trimethylolheptane, pentaerythritol and castor oil. Also suitable are mixed curing agents such as polyols having three hydroxyl groups in conjunction with a low molecular weight diol such as ethylene glycol or 1,4-butanediol. The polyols can also be mixed with polyamines having 2 or more reactive amine groups. Suitable polyamines are aromatic amines such as 4,4'-methylene-bis(2-chloroaniline) and diamino diphenyl sulfone.

For optimum results, the water content of the hydroxyl-terminated reactants should be as low as possible, and the isocyanate reaction should generally be conducted under anhydrous conditions with dry reactants, such as in a nitrogen atmosphere at atmospheric pressure. The reaction is conducted until there are essentially no free isocyanate or hydroxyl groups, (i.e. less than about 0.6 percent and preferably less than 0.3 percent by weight NCO). The ratio of reactants may vary depending upon the materials employed and the intended use of the urethane, but preferably the total number of active hydrogen atoms is approximately equivalent to the number of isocyanate groups. The NCO to active hydrogen ratio is generally from between about 0.9 to about 1.1, preferably between about 0.97 and about 1.03.

Preferably, the polurethane reaction is carried out in the presence of a catalyst. Catalysts have been found to give shorter cure times at lower temperatures and to insure complete reaction resulting in a cured polymer being essentially free of unreacted NCO groups. Suitable urethane-forming catalysts are those that are specific for the formation of the urethane structure by the reaction of the NCO group of the diisocyanate with the active hydrogen-containing compound and which have little tendency to induce side reactions. For these reasons, catalysts such as stannous salts of organic acids and organotin compounds are preferred. Preferred catalysts include stannous octoate, stannous oleate, dibutyltin diacetate, butyl stannoic acid and dibutyltin dilaurate. The amount of catalyst used in any particular reaction mixture may be determined empirically and will be determined by the desired curing time and temperature. In general, amounts of from about 5 to 1000 parts per weight of catalyst per million parts of polyurethane-forming ingredients are useful. The polyurethane compositions of the present invention may be formulated by a prepolymer method or by mixing all components simultaneously in a so-called "one-step" or bulk polymerization process.

Casting may be accomplished by merely pouring the resin into a cell, but preferably casting is accomplished by pumping a metered quantity of liquid resin into an interlayer space. After the resinous interlayer has been cast, the cell is sealed and the resin is permitted to cure in place. The time and temperature of cure will be from about 230° to 290° F. for a time up to about 24 hours. If a catalyst is present in the polyurethane the cure time can be significantly reduced from 24 to less than about 6 to 8 hours. The cured polyurethane comprising a reactive internal release agent is released from the casting cell more easily than a polyurethane composition without an internal release agent.

The present invention will be further understood from the descriptions of specific examples which follow.

EXAMPLE I

Cyclohexanedimethanol, trimethylolpropane and a polycaprolactone diol having a molecular weight of approximately 1000 are melted and mixed together under vacuum. The polycaprolactone diol component contains a UV stabilizer and an antioxidant as well as butyl stannoic acid catalyst. The equivalent weights, equivalent proportions and actual weights of the components are shown in the table below. When the temperature of the polyol mixture has dropped to about 60° C., the isocyanate component, which is at room temperature, is added. The temperature of the reaction mixture is then about 45° C. The equivalent and weight properties of the components of the reaction mixture are given below.

| Component | Equivalents | Weights |
|---|---|---|
| Trimethylolpropane | 0.23 | 10.8 |
| Polycaprolactone diol | 0.37 | 190.6 |
| Cyclohexanedimethanol | 0.40 | 30.8 |
| 4,4'-methylene-bis-(cyclohexyl isocyanate) | 1.00 | 131.0 |

The reaction mixture is cast into a cell which comprises two 12 by 12 inch (about 30 by 30 centimeter) glass plates which define a 30 mil (0.8 millimeter) space. One of the glass sheets is coated with a siloxane release coating. The filled cell is then placed in a 300° F. oven to cure the polyurethane. When the cell is removed from the oven, and an attempt is made to remove the release plate while the cell is still hot, it is not possible to remove the release plate from the cured polyurethane. The casting cell is then placed in dry ice to cool the cell to facilitate removal of the release plate. However, the release plate broke after only partial release from the polyurethane.

EXAMPLE II

Trimethylolpropane, polycaprolactone diol, cyclohexanedimethanol and 1-octadecanol are melted and mixed together in the proportions shown below.

| Component | Equivalents | Weights |
|---|---|---|
| Trimethylolpropane | 0.27 | 12.7 |
| Polycaprolactone diol | 0.35 | 175.0 |
| Cyclohexanedimethanol | 0.38 | 29.5 |
| 1-octadecanol | 0.014 | 3.75 |
| 4,4'-methylene-bis-(cyclohexyl isocyanate) | 1.03 | 135.0 |

When the temperature of the mixture of polyols falls to about 57° C., the isocyanate component which is at room temperature is added to the reaction mixture, bringing the temperature to about 44° C. The reaction mixture is then cast into cells and cured as in Example I. When the cells are removed from the oven, all of the release plates can be released while the cell is still hot from the oven, typically about 250° F.

The above examples are offered to illustrate the present invention, the scope of which is defined by the following claims.

We claim:

1. In a method for making a polymer article comprising the steps of;
   a. casting into a mold a condensation polymerization reaction mixture of reactants containing at least two reactive functional groups;
   b. polymerizing said reactants by condensation reaction to form a polymer article in the shape of said mold; and
   c. releasing the condensation polymer article from said mold, the improvement which comprises adding to said reaction mixture a long chain compound selected from the group consisting of hydrocarbons and fluorocarbons having at least one functional group which reacts with at least one reactant, said functional group so positioned on said long chain compound as to form a long carbon chain pendent from the polymer backbone in sufficient amount to improve the release of said polymer from said mold.

2. An improved method according to claim 1, wherein an organic diisocyanate is reacted with a polyol and a long chain compound to form a polyurethane with a reacted internal release agent.

3. An improved method according to claim 2, wherein the long chain compound comprises a hydrocarbon having at least one functional group selected from the group consisting of OH, NH and $NH_2$.

4. An improved method according to claim 3, wherein the hydrocarbon is a diol having at least about 8 carbon atoms.

5. An improved method according to claim 3, wherein the hydrocarbon is selected from the group consisting of 1,2 dodecanediol; 1-octadecanol and mixtures thereof.

6. An improved method according to claim 2, wherein the polyol is a polyester.

7. An improved method according to claim 6, wherein the polyester polyol is a polycarbonate diol.

8. An improved method according to claim 2, wherein the organic diisocyanate is 4,4'-methylene-bis-(cyclohexyl isocyanate).

* * * * *